June 7, 1966 C. M. SURBER 3,254,763
DETECTOR DEVICES
Filed Jan. 12, 1962 3 Sheets-Sheet 1

INVENTOR
Curtis M. Surber
BY
ATTORNEYS

June 7, 1966  C. M. SURBER  3,254,763
DETECTOR DEVICES
Filed Jan. 12, 1962  3 Sheets-Sheet 2

INVENTOR
Curtis M. Surber
BY Hastings Ackley
and
Walter J. Jagm
ATTORNEYS

June 7, 1966  C. M. SURBER  3,254,763
DETECTOR DEVICES
Filed Jan. 12, 1962 3 Sheets-Sheet 3
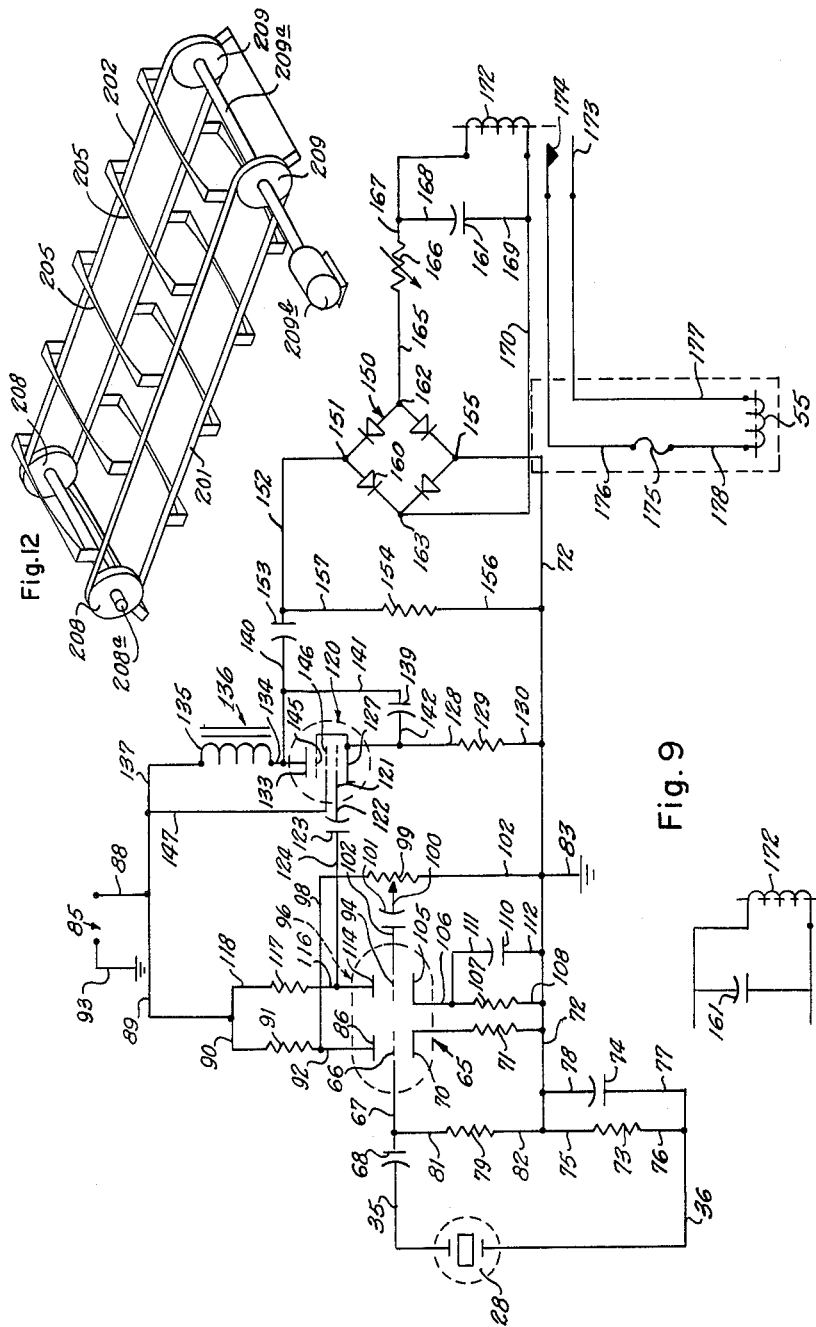
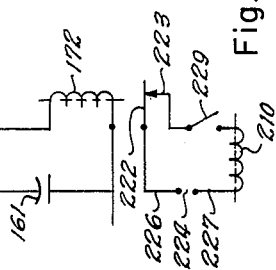
INVENTOR
Curtis M. Surber
BY
ATTORNEYS

United States Patent Office 3,254,763
Patented June 7, 1966

3,254,763
DETECTOR DEVICES
Curtis M. Surber, Wichita Falls, Tex., assignor to
Tom Huckaby, Wichita Falls, Tex.
Filed Jan. 12, 1962, Ser. No. 165,841
13 Claims. (Cl. 209—72)

This invention relates to detector devices, and more particularly detector devices for detecting a predetermined condition of articles or bodies.

An object of this invention is to provide a new and improved detector device for detecting a predetermined condition of bodies or articles.

Another object is to provide a new and improved detector device providing an electric signal which varies in accordance with a condition of the articles or objects, the electric signal being utilized to actuate a separating or rejecting mechanism for separating objects or articles whose condition departs from a desired norm.

Still another object is to provide a detector device having a track along which the objects or articles are rolled and a vibration sensing device associated with the track for sensing the vibration imparted to the detector device as the articles successively roll along the track, articles which depart from a normal condition imparting vibrations to the detector device of different characteristic, such as amplitude or frequency, than normal articles.

A further object is to provide a detector device wherein the track includes a plurality of longitudinally spaced obstructions over which the articles roll to impart vibrations to the track.

A still further object of the invention is to provide a detector device having a track or trough provided with a plurality of laterally extending longitudinally spaced serrations or ribs over which the articles to be tested move to impart vibrations to the detector device and having a voltage generating means, such as a piezoelectric crystal secured to the detector device to produce a voltage which varies in accordance with the vibrations imparted to the detector device.

Still another object of the invention is to provide a detector device wherein the signal produced by the voltage generating device is employed to actuate a sorting or rejection device for separating articles which differ in some characteristic from normal articles as these articles are moved successively over the detector device.

Another object of the invention is to provide a detector device for detecting eggs having cracked shells.

Still another object is to provide a detector device having a track or trough provided with laterally extending longitudinally spaced ribs or corrugations over which the eggs are rolled, the vibration dampening effect of cracked eggs' shells reducing the voltage produced by the piezoelectric crystal secured to the detector to detect vibrations thereof whereby the voltage produced by the piezoelectric crystal may be employed to energize a sorting or rejecting device for separating cracked eggs from uncracked eggs.

Additional objects and advantages of the invention will be readily apparent from the reading of the following description of a device constructed in accordance with the invention, and reference to the accompanying drawings thereof, wherein:

FIGURE 9 is a schematic diagrammatic illustration of the electric circuit employed by the apparatus illustrated in FIGURES 1 through 6;

FIGURE 10 is a fragmentary diagrammatic illustration of another form of the electric circuit;

FIGURE 12 is a schematic view of the pusher means for moving the eggs through the detector device illustrated in FIGURES 5 through 8.

Figure 1:
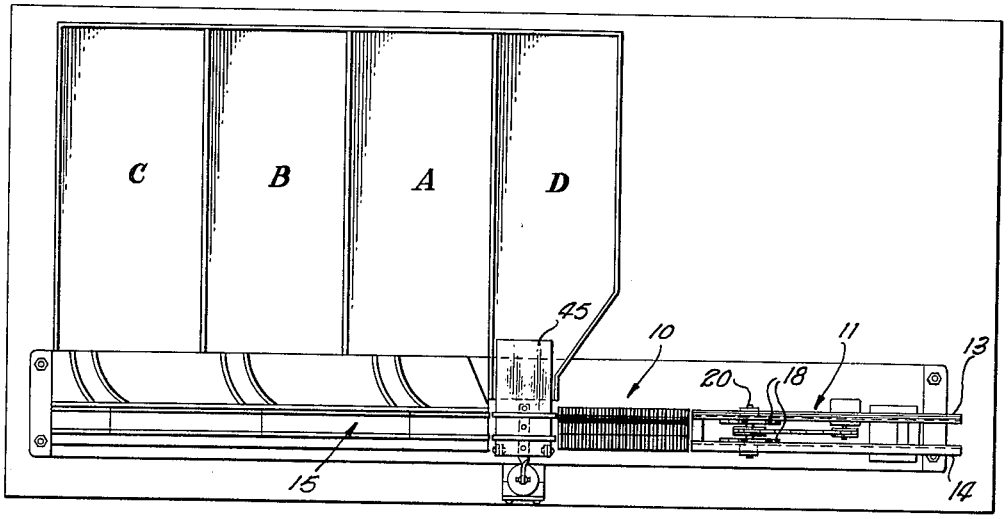
FIGURE 1 is a top view of the detector device embodying the invention shown in use with an egg grading apparatus.
Figure 2:
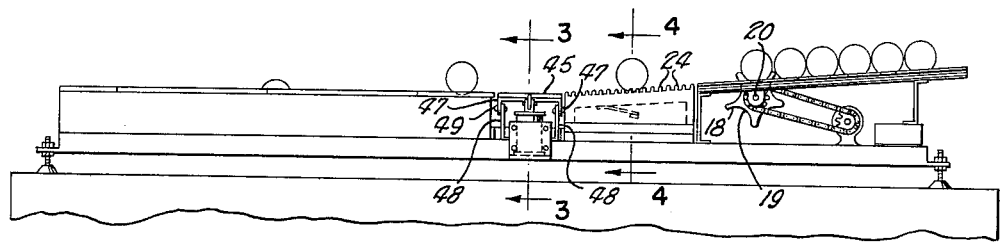
FIGURE 2 is a vertical partly sectional view of the apparatus illustrated in FIGURE 1.
Figure 3:
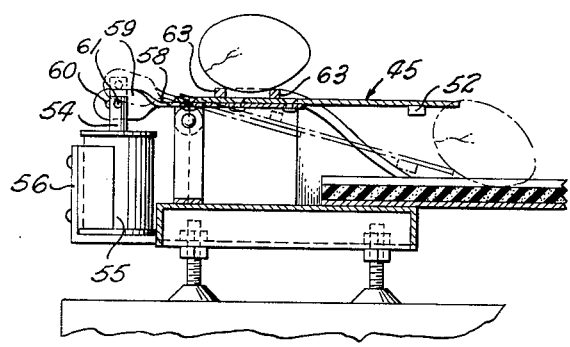
FIGURE 3 is a sectional view taken on line 3—3 of FIGURE 2.
Figure 4:
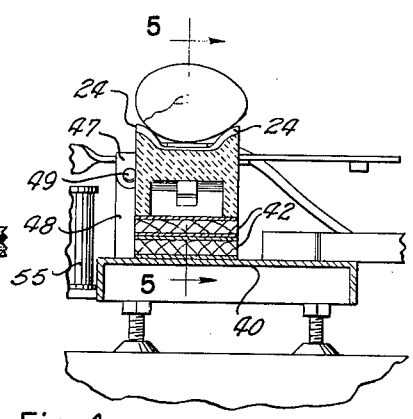
FIGURE 4 is a sectional view taken on line 4—4 of FIGURE 2.
Figure 5:
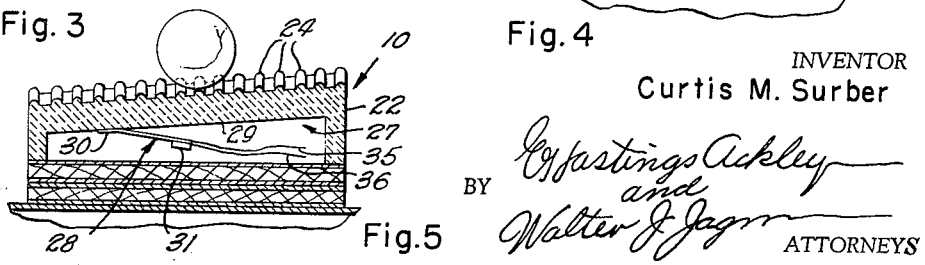
FIGURE 5 is a vertical sectional view taken on line 5—5 of FIGURE 4.

Referring now particularly to FIGURES 1 through 5 of the drawings, the detector device 10 embodying the invention is illustrated in use with an egg sorting apparatus 11, such as is now presently available under the trademark manufactured by the Speed King Company of Chicago, Illinois. The egg sorting apparatus is provided with a pair of parallel spaced inclined rails 13 and 14 down which the eggs are rolled to an egg grading device 15 which separates the eggs in accordance with their size, eggs of different sizes being moved to the three different areas or receiving trays A, B and C, by the egg grading device which forms no part of the present invention, and will not therefore be described herein.

The egg sorting apparatus includes timing wheels 18 which are provided with peripheral recesses 19 whereby, as the timing wheels are rotated by means of the shaft 20, the eggs are caused to roll to the egg sizing mechanism 15 at predetermined time intervals and are therefore kept spaced from one another by predetermined distances as they roll to the egg grading mechanism 15. The detector device 10 includes a body portion 22 of any suitable substance, such as ceramic, metal or the like, whose upper surface is in the form of a trough or track down which the eggs may roll. The track is provided with a plurality of ribs or serrations 24 which extend laterally across the track and are spaced longitudinally from one another so that an egg rolling down the trough imparts shocks or vibrations to the body 22 as it engages and rolls over the ribs. The trough or V-shape of the track provided in the upper surface of the body 22 is of such configuration and dimensions that the eggs are supported by the ribs at points which are approximately one-third the distance from the ends of the egg.

The body 22 is provided with a downwardly opening recess 27 and a vibration sensing and voltage generating means 28 is secured to the downwardly facing surface 29 of the body. The vibration sensing means 28 may be a piezoelectric crystal of the type employed in the pick-ups of photographs and has one end 30 thereof rigidly secured to the body, the other free end of the piezoelectric crystal being free to vibrate. A weight or mass 31 may be secured to the free end of the piezoelectric crystal to amplify the stresses to which the crystal is subjected and thus amplify the voltage produced by the piezoelectric crystal when it is vibrated which occurs when the body 22 vibrates. If desired, the crystal may be secured rigidly to the body throughout its whole length in which case it output is smaller or greater amplification thereof may be necessary. The conductors 35 and 36 from the piezoelectric crystal extend outwardly of the body 22 in any suitable manner. The conductors 35 and 36 are provided with a considerable slack and are of very little mass so that they do not materially dampen or distort the vibration of the piezoelectric crystal.

The body 10 is mounted on a supporting structure 40 of the egg sorting apparatus 11, in any suitable manner, as by an adhesive with vibration absorbing or isolating pads 42 disposed between the body and the supporting structure in order that extraneous vibrations of the supporting structure will not effect the operation of the detector device 10.

The track or trough of the body 22 slopes downwardly toward a reject gate 45 disposed at the lower end of the trough or track so that eggs rolling over the track of the detector device pass onto the gate and must roll thereover to the egg grading mechanism 15. The reject gate has depending lugs 47 which extend past the upper ends of the vertical posts 48 rigidly secured to the supporting structure and which are pivotally connected to the vertical posts by means of the pivot pins 49. It will thus be apparent that the reject gate 45 is mounted for pivotal movement about a horizontal axis which extends parallel to the longitudinal axis of the track or trough. The reject gate, when allowed to pivot downwardly, causes any egg which is disposed thereon at that time to roll downwardly into a reject tray D of the apparatus. The gate is normally biased to its lower position by a balance weight 52 secured to the underside thereof. The gate is maintained in its upper horizontal position by the armature 54 of the solenoid 55. The solenoid is rigidly secured to the supporting structure in any suitable manner, as by the bracket 56. A lug 58 secured to the gate by any suitable means has a vertical outer portion 59 disposed in an upwardly opening slot in the upper end of the armature and has a slot 60 through which extends a pin 61 which is also secured to the upper end of the armature 54. The slot 60 of the lug 58 is elongated to permit some longitudinal movement of the lug 59 relative to the pin 61 to accommodate the pivotal movement of the lug as the gate moves between its normal horizontal position and its lower broken line position illustrate in FIGURE 3. The gate may be provided with a pair of tracks or guides 63 which serve to guide the rolling movement of the egg over the gate when the gate is in its upper position.

During operation of the egg sorting appartus 11, the eggs are caused to roll one by one in timed and spaced relation to one another from the tracks 13 and 14 onto the trough of the body 22 by the timing wheels 18, the shaft 20 rotating at a desired predetermined speed to insure that only one egg is ever supported on the body 22 and rolling thereover. As the egg rolls down the trough and over the ribs or serrations 24, the egg imparts vibrations to the body 22 and thus causes the piezoelectric crystal to be subjected to vibrational stresses which produce a varying voltage whose frequency and amplitude varies in accordance with the vibration of the body 22. It has been found that eggs with whole shells impart vibrations of greater amplitude to the body 22 than eggs with cracked shells since the cracks in the shells tend to dampen such vibrations. The voltage generated by the piezoelectric crystal 28 maintains the solenoid in an energized condition when an egg with an upbroken shell rolls down the trough of the detector device and over the reject gate 45 so that the reject gate 45 is held in its upper position. When an egg with a cracked shell, however, rolls down the track of the detector device and onto the reject gate, the solenoid is deenergized so that the balance weight 52 and the weight of the egg cause the gate to pivot downwardly to the broken line position indicated in FIGURE 3, which then permits the egg to roll down the gate 45 into the reject tray D of the sorting apparatus. In this manner eggs with unbroken shells are permitted to move past the detector device and its reject gate 45 to the egg grading device 15 which then causes the eggs to roll into the trays A, B and C in accordance with their sizes.

The circuit illustrated in FIGURE 9 for controlling the energizations of solenoid 55 in accordance with the output of the piezoelectric crystal 28 includes a first electric discharge means 65 whose control grid or member 66 is connected to one side of the piezoelectric crystal 28 through the conductor 67, the blocking capacitor 68 and the conductor 35 whose cathode 70 is connected to the other side of the piezoelectric crystal through the resistor 71, the conductor 72, the resistor 73 and the conductor 36. A capacitor 74 is connected across the resistance 73 by means of the conductors 72, 75, 76, 77 and 78. A grid bias resistance 79 is connected between ground and the control grid 66 by means of the conductors 67, 81, 82, 72 and 83. The anode-cathode circuit of the electric discharge device 65 is connected across a suitable source of voltage 85, the anode or plate 86 of the electric discharge device being connected to one side of the supply circuit 85 through the conductors 88, 89 and 90, the resistor 91, the conductor 92, the resistance 71 and the conductors 72 and 83. The cathode is connected to the other side of the supply circuit by means of the resistance 71, the conductors 72 and 83, ground and the conductor 93. The electric discharge 65 acts as an amplifier for the voltage produced by the piezoelectric crystal 28.

The anode of the electric discharge device 65 is connected to the control member or grid 94 of a second electric discharge device 96 through the conductor 98, the resistance 99, the movable contact 100, the capacitor 101 and the conductor 102. The resistance 99 is connected to ground through the conductors 102 and 83. The cathode 105 of the electric discharge means 96 is connected to the supply circuit through the conductor 106, the resistance 107, the conductors 108, 72 and 83, ground and the resistance 93. A capacitor 110 is connected across the resistance 107 by means of the conductors 111, 112, 72 and 108. The anode or plate 114 of the electric discharge means 96 is connected to the supply circuit 85 through the conductor 116, the plate resistor 117, and the conductors 118, 89 and 88. It will thus be apparent that the electric discharge device 96, which may be in the same envelope as the electric discharge means 65, amplifies the output of the electric discharge means 65.

A third electric discharge device 120 has a control grid 121 which is connected to the plate of the electric discharge means 96 by means of the conductor 122, the condenser 123, and the conductors 124 and 116 while its cathode 127 is connected to ground through the conductor 128, the resistor 129, and the conductors 130, 72 and 83. The plate or anode 133 of the control electric discharge device 120 is connected to one side of the supply circuit by means of the conductor 134, the winding 135 of an inductance 136, and the conductors 137 and 88. A capacitor 139 is connected across the anode-cathode circuit of the control electric discharge device by means of the conductors 140, 141, 142 and 128. The suppressor grid 145 is connected to the cathode 127 while the screen grid 146 is connected to one side of the input circuit through the conductors 147, 137 and 88.

It will now be apparent that the electric discharge means 65, 96 and 120 act as amplifiers for the output of the piezoelectric crystal 28 whose frequency and amplitude vary in accordance with the vibrations imparted to the body 22 of the detector device 10 by an object, such as an egg, rolling down its trough and engaging its ribs 24.

A full wave rectifier 150 has one input terminal 151 connected to the plate of the third electric discharge device 120 by means of the conductor 152, the blocking capacitor 153 and the conductors 140 and 134. The other input terminal 155 of the rectifier is connected to ground through the conductors 72 and 83. A resistance 154 is connected across the anode-cathode circuit of the third electric discharge device and also across the input terminals 151 and 155 of the full wave rectifier by means of the conductors 152, 157, 156 and 72. The full wave rectifier may be of the usual type employing four semiconductors or diodes, such as the usual selenium or copper oxide rectifiers 160. A capacitor 161 is connected across the output terminals 162 and 163 of the full wave rectifier by means of the conductor 165, the variable resistance 166 and the conductors 167, 168, 169 and 170. The relay winding 172 is similarly connected across the output terminals 162 and 163 of the full wave rectifier through the conductor 165, the variable resistance 166 and the conductors 167 and 170. It will be apparent that the capacitor 161 is therefore connected in parallel with or across the relay winding 170. The relay winding 172 when energized by a current of predetermined value moves the movable contact 173 into engagement with the stationary contact 174 to connect the solenoid 55 across an input circuit 175 which energizes the solenoid with a current to cause its armature to move downwardly. The stationary contact is connected to one side of the input circuit 175 by a conductor 176 and the solenoid winding is connected to the movable contact by the conductor 177 and to the other side of the input circuit by the conductor 178. The movable contact is normally in an open condition and is moved to the closed position when the relay winding 172 is energized with a current of a predetermined value.

In use, as the egg rolls down the trough of the detector device 22, it imparts vibration to the body 22 by successively engaging the ribs 24 of the body 22. The output of the piezoelectric crystal is amplified by the three electric discharge devices 65, 96 and 120 and rectified by the full wave rectifier 150. As the egg continues to roll down the trough of the body 22 the output of the rectifier 150 charges the condenser 161 which, initially at least, appears as almost a dead short to the output terminals of the rectifier so that very little current flows through the relay winding 172 as the egg rolls down the trough. If the egg has a sell which is not broken the vibrations are of such amplitude that the condenser is charged to a value sufficiently high that as the egg commences to roll off the trough onto the gate 45 the current flowing through the relay winding 172 is sufficient to move the movable contact 173 into engagement with the stationary contact 174 whereupon the solenoid 55 is energized and moves the reject gate 45 to its upper position to receive the egg and cause it to move over the gate and onto the egg grading mechanism 15. The discharge of the condenser 161 causes the current to continue to flow through the relay winding 172 for a sufficient period of time after the egg has rolled off the trough and onto the gate to maintain the solenoid in an energized condition for a period of time long enough to permit the egg to roll off the reject gate and to the egg grading device 15 even after the output of the piezoelectric crystal has dropped to zero as the egg moves out of engagement with the detector device 10. It will be apparent that the variable resistance 166 and the capacitor 161 function as a time relay means for the relay winding 172 to keep the relay winding 172 energized a sufficent period of time to permit unbroken eggs to roll off the reject gate and to the egg grader. This length of time may of course be adjusted by varying the value of the resistance 166. In the event that an egg with a broken shell moves onto the trough of the body 22 and rolls over the ribs or serrations 24, the crack in the egg shell dampens or decreases the force with which the egg engages the ribs so that the voltage generated by the piezoelectric crystal 28 is not sufficient to charge the capacitor 161 to the voltage necessary to cause the current flowing through the relay winding 172 to be high enough to move the movable contact 173 into engagement with the stationary contact 174. As a result, when an egg with a broken shell rolls onto the reject gate 45, the gate is in its lower position illustrated in FIGURE 3, or should it be in its upper position the added weight of the egg with the broken shell will cause it to pivot downwardly to its lower position, to permit the egg to roll down the reject gate and into the reject tray D. If the next egg has an unbroken shell, the relay winding 172 will again be energized to the degree necessary to cause the movable contact 173 to move into engagement with the contact 174 and thus cause the energization of the solenoid 55 and the raising of the reject gate to its raised position to cause such unbroken egg to move over the reject gate to the egg grader device 15.

It will be apparent that the eggs are automatically sorted by the detector device with the defective or broken shelled eggs being separated from the eggs with the unbroken shells and moved to the reject tray. The eggs are moved consecutively over the detector device, the rotation of the timer or feed wheels 18 insuring that only one egg is rolling down the track trough of the detector device at any particular time. The speed of the timer wheels of course may be controlled by any suitable means, such as a variable speed electric motor.

Figure 6:
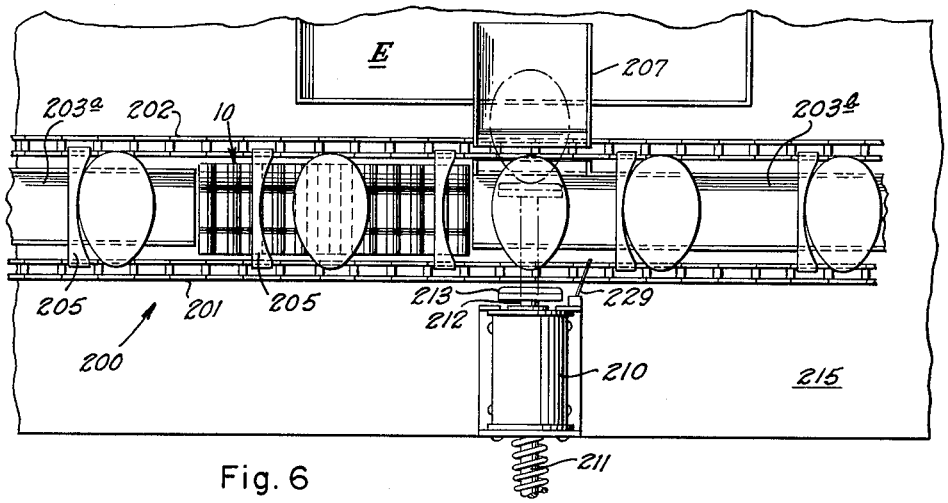
FIGURE 6 is a top plan view of the detector device employed with a different form of egg grading mechanism.
Figure 7:
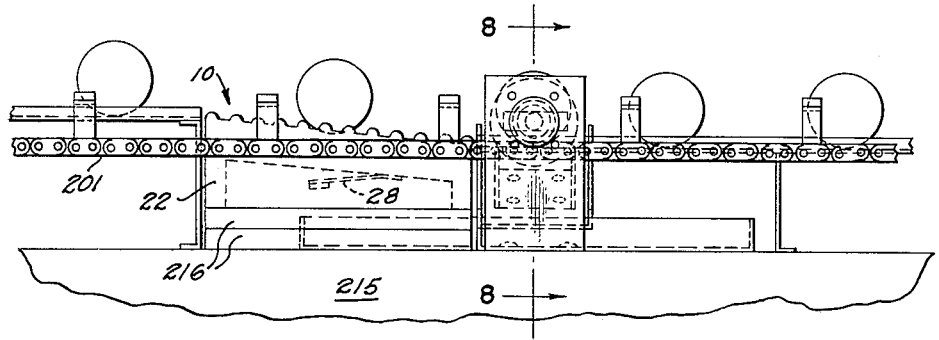
FIGURE 7 is a sectional view of the apparatus illustrated in FIGURE 6.

FIGURES 6 and 12 illustrate the use of the detector device embodying the invention with an egg sorter apparatus of the type now commercially available as Model EG-1, produced by the Barker Poultry Equipment Company. Such apparatus may employ one or two endless chains 201 and 202 connected by longitudinally spaced pusher bars 205. The pusher bars extend across a track having an upper section 203a spaced from a lower section 203b. Each of the pusher bars is of substantially inverted U-shaped having legs 205a and 205b whose lower ends extened below the track and are secured to the chains 202 and 201, respectively. If only one chain is employed, the pusher bar has only one leg 205a secured to such single chain. Each of the pusher bars engages the rear portion of the egg so that as the endless chains move in unison the eggs are moved along the track section 203a onto the upper end of the trough or track of the body 22 which is inclined downwardly in the direction of movement of the chains so that each egg as it moves onto the upper end of the trough or track of the body 22 moves by gravity down the trough and out of engagement with the pusher rods which had moved it to this position. The speed of the chains is such that the immediately preceding pusher bar moves past the lower end of the body 22 and past a reject chute 207, as the egg rolling down the track of the detector devices moves onto the lower section 203b into alignment with the reject chute 207.

As schematically shown in FIGURE 12, the endless chains may extend about idler sprockets 208 rigidly mounted on a rotatably supported shaft 208a and about drive sprockets 209 rigidly mounted on a drive shaft 209a driven by a motor 209b whose speed may be varied as desired.

Figures 8, 11:
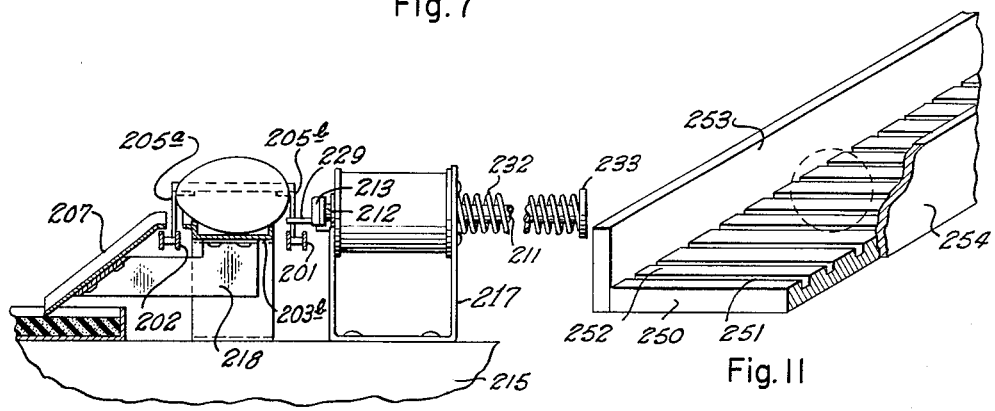
FIGURE 8 is a sectional view taken on line 8—8 of FIGURE 7.
FIGURE 11 is a perspective view of another form of the detector device.

The output of the crystal 28 of the detector device 10 is employed to energize a solenoid 210 whose armature 211 extends laterally outwardly from the track of the egg sorter apparatus and is provided a forward extension 212 having a bumper or pusher plate 213 so that when the solenoid is energized the armature moves to the left, as illustrated in FIGURE 8, and the bumper or pusher plate engages an egg which may be disposed on the lower section 203b of the egg sorter device in alignment with the reject chute 207 to push the egg onto the reject chute. The egg then rolls downwardly by gravity through the reject chute to a reject tray E. The body 22 of the detector device is secured to a supporting structure 215 of the egg sorter apparatus in any suitable manner with vibration absorbing or isolating pads 216 interposed therebetween. The solenoid is secured to the supporting structure by means of a substantially U-shaped bracket 217 while the discharge chute 207 is secured to the underside of the track section 203b by substantially L-shaped bracket 218. It will be apparent that the solenoid must be energized immediately after an egg with a broken shell rolls off the lower end of the track or trough of the body 22 of the detector device onto the lower track 203b and into alignment with the reject chute 207 so that the pusher plate 213 connected to the armature by the extension 212 will push such defective egg onto the reject chute 207. The movable contact 222 is connected to one side of the supply or input circuit 224 by a conductor 226 while the solenoid 210 has one end connected to the input circuit by the conductor 227 and has its other side connected to the stationary contact 223 by the conductor 228 and the switch 229. The normally open switch 229 is mounted on the bracket 217 of the solenoid and extends into the path of movement of the legs 205b of the pusher bars and is closed by one of the arms as each egg rolls into alignment with the reject chute. The armature and pusher plate are maintained in the inoperative position illustrated in FIGURES 5 and 6 and 8 by a compression spring 232 disposed about the armature whose opposite ends engage the solenoid and an annular flange 233 disposed on the outer end of the armature. The control circuit for the operation of the solenoid 210 in all other respects is identical with the control circuit illustrated in FIGURE 9.

In use, the eggs which are to be graded by the egg sorting machine are moved over the upper track section 203a by the pusher bars of the endless chains 201 and 202 and onto the upper end of the trough of the detector device 10. As each egg moves onto the upper end of the track or trough of the body 22 of the detector device, it commences to roll by gravity down the trough and over the ribs or serrations of the body which define the trough. The vibrations thus imparted to the body cause a voltage to be generated by the piezoelectric crystal 28 whose frequency and voltage vary in accordance with the frequency an amplitude of the vibrations imparted to the body 22. When an egg with an unbroken shell rolls down the track or trough of the body 22, the output of the piezoelectric crystal 28, amplified by the electric discharge means 65, 96 and 120 and rectified by the full-wave rectifier 150, charges the condenser 161 in excess of a predetermined high value to cause the relay winding 172 to be energized with a current of such value as to move the movable contact out of engagement with the stationary contact 223 as the egg rolls onto the lower track section 203b and into alignment with the reject chute 207. Prior to this time, the pusher bar immediately forward of the egg rolling down the body 22 has moved out over the lower track section 203b so that it will not impede the movement of such egg onto the lower trough section and its leg 205b moves the switch 229 to closed position as the egg moves into alignment with the reject chute. As the egg with the unbroken shell rolls off the trough and into alignment with the discharge trough no further vibrations of course are imparted to the body 22 and therefore no further voltage is transmitted to the condenser and the relay winding 172. The discharge of the capacitor at this time will cause sufficient current to flow through the relay winding 172 to hold the movable contact 222 out of engagement with the stationary contact 223 so that the solenoid will not be energized even though the switch is now in closed position. As the capacitor 161 discharges and allows the movable contact 222 to return to its normal position in contact with the stationary contact 223, the leg 205b of the pusher rod which has been in engagement with the switch 229 maintaining it closed moves out of engagement therewith so that the switch 229 moves to open position prior to the movement of the movable contact 222 to the closed position in engagement with the stationary contact 223. As a result, as the egg with an unbroken shell passes the discharge chute the solenoid 210 remains de-energized and the egg moved by its pusher bar, which catches up with it, moves past the discharge chute to be graded according to size by other mechanisms of the egg sorting apparatus.

When an egg with a broken shell, however, is moved to the upper end of the detector device 10 and rolls over the ribs 24 thereof, the capacitor 161 is never charged to the value necessary to cause sufficient current to flow through the relay winding 172 to move the movable contact into engagement with the stationary contact 223. As a result, when the egg rolls onto the lower track section 203b and in alignment with the discharge chute 207, the leg 205b of the pusher bar immediately in front of the egg with the broken shell closes the switch 229 to connect the solenoid 210 across the input circuit 224 and the armature 211 thereof is moved against the resistance of the spring 232 to move the pusher plate 213 over the lower track 205b to engage the egg with the broken shell and move it into the reject chute 207 down which it rolls by gravity to the reject tray E. As the chains continue to move, the leg 205b of the pusher bar moves out of engagement with the switch 229 which moves back to open position denergizing the solenoid so that the pusher plate is moved back by the spring to its inoperative position, illustrated in FIGURES 6 and 8, to permit the next pusher bar to move therepast.

It will be apparent that the speed of movement of the chains and pusher bars must be varied in accordance with the slope of the trough or track of the detector device and the nature of the objects, such as the eggs, rolling down the trough so that the pusher bars will move in timed and synchronized relation to the closing of the switch 229 by the pusher bars and to movement of the eggs over the detector device to permit the eggs to roll unhampered down the track of the detector device and into alignment with the reject chute 207. This, of course, is easily accomplished by providing a variable speed drive for the chains 201 and 202.

In the sorting of eggs, it is especially desirable that eggs having broken shells be separated from the eggs without the broken shells prior to the operation of other mechanisms of the egg sorting device which may malfunction when an egg with a broken shell is processed thereby. For example, any apparatus employing pneumatic means for lifting or grading eggs is very susceptible to damage since when an egg with a broken shell is processed thereby, the contents of the egg may be sucked into the pneumatic mechanism which must then be disassembled, cleaned and reassembled before it can again be used.

It will now be apparent that a new and improved detector device has been illustrated and described for detecting a predetermined condition of articles or bodies, such as eggs, and that the detector device includes a body having a plurality of ribs or serrations over which the articles whose condition is to be sensed or detected are moved to impart vibrations to the body and that the vibrations are sensed by a sensing means, such as the piezoelectric crystal 28, which generates a voltage whose frequency and amplitude vary in accordance with the frequency and amplitude of the vibrations imparted to the body.

It will further be seen that the output voltage of the vibration sensing means may be employed to separate defective articles or bodies or those having a predetermined condition from the articles or bodies without the defect or not having the predetermined condition.

It will further be seen that the output of the vibration sensing means may be used to energize some device, such as the solenoid 55, whose operation it controls, or to prevent or cause de-energization of the device it controls, such as the solenoid 210.

While the detector device has been illustrated and described for detecting eggs having cracked egg shells, it will be apparent that the detector device may be employed to detect a differential predetermined condition of eggs or of other articles, objects or products. For example, the detector device may be used to detect the condition of eggs, nuts or fruits, which may be rolled down the trough of the detector device to detect and separate eggs having strong shells from those having weak or soft shells or to separate sound nuts or fruits from spoiled or deteriorated nuts or fruits, since obviously such bodies with soft spots or of softer or rotted constituency will impart less vibration to the body than bodies without such defects.

It will also be apparent that the particular shape of the ribs may be varied as desired and that the ribs may have flattened or more arcuate top portions instead of the relatively sharp top portions illustrated in the drawings in order to prevent undesired marring or indentation of softer articles which may roll over the ribs. The ribs of the body 22 may extend only up the sides of the trough with the bottom of the trough ribless, if desired, since the eggs obviously will never engage the bottom of the trough. However, if the condition of objects of small size is to be determined by the use of the detector device as well as that of relatively large objects, such as eggs, the ribs may extend continuously across the trough. Moreover, the thickness, spacing and number of ribs or obstructions per unit length of the track may be varied as required by the size and other characteristics of such bodies.

If desired, the track instead of having a trough of substantially V-shape may be planar in form as illustrated in FIGURE 11, wherein the body 250 is provided with a plurality of transverse grooves 251 in its upper planar surface which provide ribs or corrugations 252 over which an object may roll to impart vibration to the body 250 which will be sensed by a suitable vibration sensing means, such as the crystal 28, secured to the body. The body 250 may be provided with vertical flanges 253 and 254 to prevent the objects which move longitudinally over the top flat surface of the body 250 from rolling laterally off the top flat surface.

It will be apparent that a detector device having the body 250 may be used to detect the extent to which such containers as tin cans are filled, a full container imparting vibrations of greater amplitude to the body 250 as it rolls over the ribs or corrugations 252 than a partly filled container since the more room the contents of the can have to move within the can, the more they dampen or reduce such vibrations.

The detector devices illustrated in the drawings may also be employed to detect such conditions as the sphericity of ball bearings, and the like, it being apparent that ball bearings of perfect spherical shape will impart vibrations having different characteristics to the detector device 10 or to a detector device employing the body 250 than will ball bearings, or the like, of eccentric or not perfectly spherical shape. In addition, a ball bearing, or the like, whose center of gravity is not located at the center due to voids or non-homogeneity of the metal will impart vibrations to the detector device having different characteristics than a ball bearing whose center of gravity does lie at its center.

While the track or trough of the body 22 of the detector device is inclined to permit objects to roll down the trough by gravity, it will be apparent that the track could extend horizontally and the objects might be moved thereover by any suitable means, such as a propelling means which would impart a velocity to the objects sufficiently greater that the objects would traverse the track from one end to the other.

It will further be apparent that while the detector device has been illustrated and described as being employed to separate objects having defective or predetermined conditions from like articles which are not defective or which do not have the predetermined condition, the detector device may be used simply to determine the number or percentage of such defective objects or objects having the predetermined condition in a given number of such objects. In this event, the output of the vibration sensing means would be employed to operate a counter, recorder, or the like, so that when a given number of objects have passed over a detector device, the number of such objects which are defective or have the predetermined condition can be readily determined.

It will now be seen that a new and improved detector device has been illustrated and described which permits the rapid processing of objects, such as eggs, nuts, fruit, containers, balls, and the like, to detect among such objects those which have a predetermined condition, such as a defect, and which permits the separation of such objects having the predetermined condition from the others which do not have the predetermined condition.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A detector device including: a body having a track over which objects supported thereon may move; said body having a plurality of spaced obstructions extending across the path of movement of the objects whereby the obstructions are engaged successively by an object as it moves over the track, vibrations being imparted to said body by an object as it moves over the track and engages the obstructions; and means connected to said body for sensing the vibrations of the body and producing an electric signal which varies in accordance with the vibrations.

2. A detector device including: a body having a longitudinal trough in its top portion, said trough having downwardly convergent sides, said sides having transversely extending longitudinally spaced ribs whereby an object moving longitudinally through said trough engages said ribs and imparts vibrations to said body; and means for sensing the vibrations of the body and producing an electric signal which varies in accordance with the vibrations.

3. In an apparatus having a longitudinal track over which objects to be sorted are movable, a detector device including: a body having an upper surface constituting a section of the track, said upper surface having a plurality of longitudinally spaced obstructions; a vibration sensing means for detecting vibrations of said body caused by the movement of objects over the obstructions and generating an electric signal which varies in accordance with the vibrations of the body; and means for moving objects from the track of the apparatus, said vibration sensing means controlling the operation of said moving device whereby said moving device may move objects having predetermined conditions from said track after the objects having such predetermined conditions have induced vibrations in the body.

4. The device of claim 3 wherein said moving means is electrically energized, and control means responsive to said signal for controlling operation of said moving means when an object having a predetermined characteristic moves off the track section formed by said body.

5. The device of claim 3 wherein said moving means is electrically energized, and control means responsive to said signal for controlling operation of said moving means when an object having a predetermined characteristic moves off the track section formed by said body, said control means including amplifier means for amplifying said electric signal and time delay means for delaying actuation of said moving means until an object having the predetermined condition moves off the track section.

6. In an apparatus having a longitudinal track over which objects to be sorted are movable, a detector device including: a body having an upper surface constituting a section of the track, said upper surface having a plurality of longitudinally spaced obstructions; a vibration sensing means for detecting vibrations of said body caused by the movement of objects over the obstructions and generating an electric signal which varies in accordance with the vibrations of the body; and means for moving objects from the track of the apparatus, said vibration sensing means controlling the operation of said moving device whereby said moving device may move objects having predetermined conditions from said track after the objects having such predetermined conditions have induced vibrations in the body, said upper surface being inclined downwardly in the direction of movement of the objects over the track whereby the objects roll by gravity over said obstructions.

7. In an apparatus having a longitudinal track over which objects are moved sequentially by longitudinally spaced individual pusher means, a detector device including: a body having an upper surface constituting a section of the track, said section sloping downwardly in the direction of movement of objects over the track whereby an object moved onto the section by a pusher means will roll down by gravity over the section, said body having a plurality of longitudinally spaced obstructions engaged by an object moving down the section whereby engagement of the obstructions by the object imparts vibrations to said body; and vibration sensing means for sensing vibration of the body caused by the engagement of the object with the obstructions and for producing a signal which varies in accordance with the vibrations.

8. The device of claim 7, and moving means responsive to said signal for moving objects off the track.

9. The device of claim 8, said moving means comprising a drive means movable laterally over the track for engaging and moving an object laterally off the track.

10. In an apparatus having an inclined longitudinal track and timing means for sequentially releasing objects for movement down the track, a detector device including: a body having an upper inclined longitudinal surface forming one section of said track, said upper surface having a plurality of longitudinally spaced obstructions engageable by objects moving over said one section, objects engaging said obstructions imparting vibrations to said body; means for sensing the vibrations of the body; gate means disposed below said section and forming another section of said track for receiving objects moving off said one section; and operator means responsive to said signal for moving said gate means to permit selected objects to move laterally off the track.

11. The device of claim 10, wherein said operator means is electrically operated, and control means responsive to said signal for electrically energizing said operator means.

12. A detector including: a body having a top surface provided with a plurality of transversely extending longitudinally spaced ribs whereby an object moving longitudinally over said body successively engages said ribs and imparts vibrations to said body; and means connected to said body for sensing the vibrations of the body and providing an electric signal which varies in accordance with the vibrations.

13. In an apparatus having a longitudinal track over which objects are moved sequentially by longitudinally spaced individual pusher means, a detector device including: a body having an upper surface constituting a section of the track, said section sloping downwardly in the direction of movement of objects over the track whereby an object moved onto the section by a pusher means will roll down by gravity over the section, said body having a plurality of longitudinally spaced obstructions engaged by an object moving down the section whereby engagement of the obstructions by the object imparts vibrations to said body; vibration sensing means for sensing vibration of the body caused by the engagement of the object with the obstructions and for producing a signal which varies in accordance with the vibrations; moving means responsive to said signal for moving objects off the track, said moving means comprising a drive means movable laterally over the track for engaging and moving an object laterally off the track; and control means for said drive means including the switch means closable by a pusher means immediately forward of an object moving off the track section into lateral alignment with the drive means and relay means responsive to said signal, said switch means and said relay means closing to energize said drive means when said signal does not exceed a predetermined value.

References Cited by the Examiner
UNITED STATES PATENTS

| | | | |
|---|---|---|---|
| 2,208,202 | 7/1940 | Stanton | 73—69 X |
| 2,570,485 | 10/1951 | Rieber | 209—88 |
| 2,631,716 | 3/1953 | Kottman | 198—168 |
| 3,001,394 | 9/1961 | Nelson | 73—71.7 |
| 3,004,662 | 10/1961 | Armstrong | 209—72 |
| 3,067,605 | 12/1962 | Bliss | 73—12 |

ROBERT B. REEVES, *Primary Examiner.*

CLAUDE A. LEROY, SAMUEL F. COLEMAN, J. PETO, *Assistant Examiners.*